Dec. 16, 1958 G. WINTRISS 2,864,910
CIRCUIT CONTROL APPARATUS FOR AUTOMATIC MACHINES
Filed Jan. 22, 1957
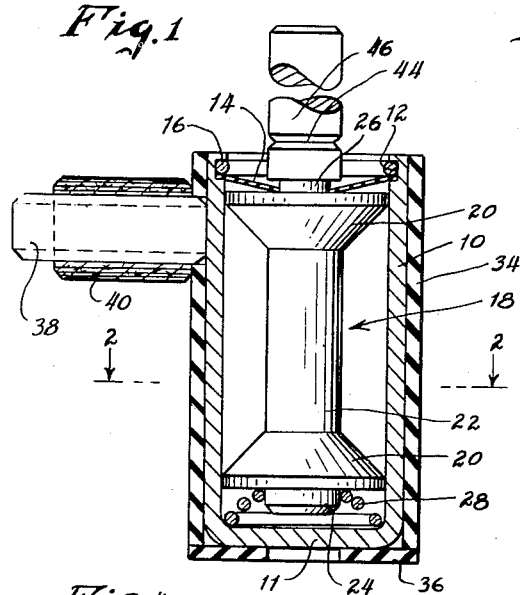
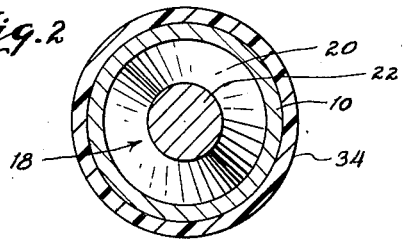
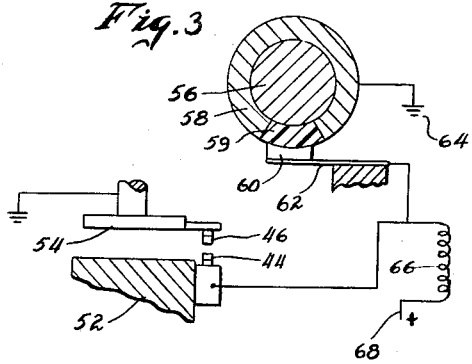
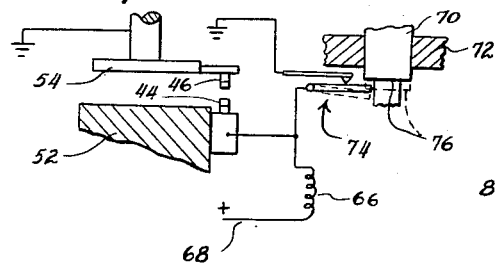
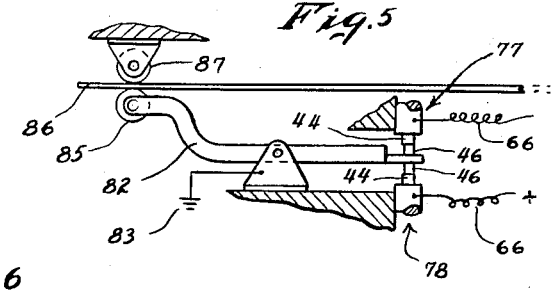
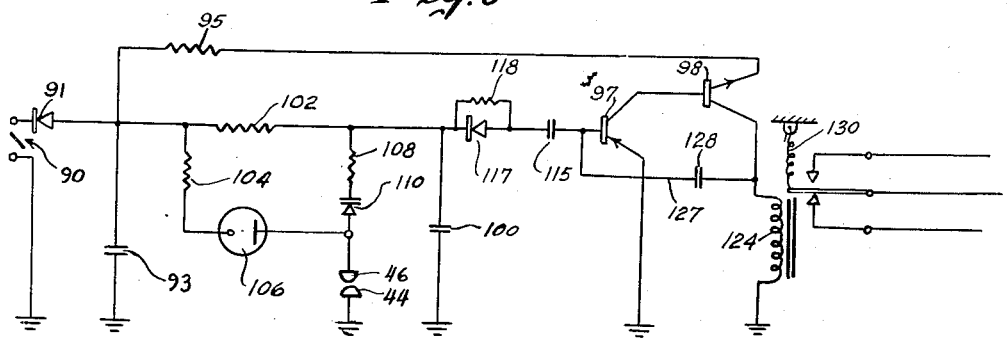
INVENTOR.
George Wintriss.
BY Emery, Whittemore,
Sandoe & Dix.
ATTORNEYS

2,864,910

CIRCUIT CONTROL APPARATUS FOR AUTOMATIC MACHINES

George Wintriss, Carversville, Pa.

Application January 22, 1957, Serial No. 635,541

12 Claims. (Cl. 200—61.48)

This invention relates to control apparatus for electric circuits and more especially to automatic apparatus for controlling the circuit in accordance with the operation of a machine. The invention relates also to a novel electric switch which is self compensating and which makes practical and reliable the operation of the control circuits of this invention over long periods of time.

It is an object of this invention to provide improved electric control apparatus for a machine, and to construct the control apparatus so that it will respond to irregularities in the operation of the machine even though the irregularities are of extremely small magnitude. Another object of the invention is to provide control apparatus which will respond to the failure of a part of a machine to move into an expected position or to remain in a predetermined position during the operation of the machine. For example the failure of a die to completely close; or a ram to complete its full stroke, or a roller to remain within a predetermined limited position, may be detected by the control apparatus of this invention.

The invention may be used to operate a signal or it may be used to operate a clutch or automatic stop. It may be used as overload protection for a machine, or for detecting failures in the proper feeding of the work and for many other purposes. It has been customary with overload devices to rely upon forces caused by strain or excessive current flow to actuate the overload device; but when used for overload protection this invention operates on a different principal and detects the inability of a part to complete its movement to a normal position which should be occupied at certain repeated periods during the cyclic operation of the machine.

It is another object of the invention to provide a self compensating electric switch that automatically adjusts its position so as not to be affected by wear or by any gradual changes in the operating conditions of the equipment with which the switch is used. This self compensating switch is an essential part of some of the control apparatus which forms a part of this invention.

Another object of the invention is to provide apparatus for detecting sudden changes in the position of parts which are normally static or subject to very gradual movement in the operation of a machine or other equipment. This object is attained by combinations including the self compensating switch which maintains a circuit in spite of changes in condition of a gradual nature and for which the switch can compensate; but the apparatus detects any sudden change in the position of parts when the change is more rapid than the compensation of the switch to the new condition. The sensitivity of the control apparatus, and the time constants of static conditions which the apparatus detects, can be controlled by changing the switch to obtain rapid or slower compensation to changes in the positions of its contacts.

Other objects, features and advantages of the invention will appear or be pointed out as the description proceeds.

In the drawing, forming a part hereof, in which like reference characters indicate corresponding parts in all the views;

Figure 1 is a vertical sectional view through the self compensating switch of this invention;

Figure 2 is a sectional view taken on the line 2—2 of Figure 1;

Figure 3 is a diagrammatic view showing the switch combined with control apparatus having a rotary switch that operates in timed relation with the working parts of the machine;

Figure 4 is a diagrammatic view showing the invention applied to a machine having a reciprocating ram;

Figure 5 is a diagrammatic view showing application of the switch to apparatus for detecting sudden change in the static condition of machine parts; and Figure 6 is a wiring diagram for another modified form of the invention.

The self compensating switch shown in Figure 1 includes a cylinder 10 of uniform diameter and closed at its lower end by a bottom wall 11. Near the upper end of the cylinder 10 there is an annular recess 12. A diaphragm 14 has its peripheral edge located in the recess 12; and there is a snap ring 16 in the recess 12 for holding the circumferential edge of the diaphragm 14 securely in the recess 12.

A piston element 18 is located within the cylinder 10. This piston element 18 has heads 20 at its upper and lower ends, the heads being connected by a stem 22. A stud 24 projects from the bottom of the lower head 20, and a piston rod 26 extends from the upper head 20, through an opening in the diaphragm 14 and to a level which is preferably slightly higher than the upper end of the cylinder 10.

There is a conical coil spring 28 in the lower end of the cylinder 10 below the lower head 20 of the piston element 18. At its upper end, the spring 28 is of a diameter to fit around the stud 24; and at its lower end, the spring 28 is of a diameter to fit within the bore of the cylinder 10. This is a particularly efficient form of spring for urging the piston element 18 upwardly in the cylinder; but it will be understood that the spring 28, in the broader aspects of the invention, is merely representative of means for giving the piston element 18 a bias toward the upper end of the cylinder.

When the spring 28 is fully expanded, the position of the piston element 18 is preferably somewhat below the annular recess 12 so as not to impose any load on the diaphragm 24 tending to push the diaphragm out of the upper end of the cylinder.

The diaphragm 14 is preferably made of a thin and pliable plastic sheet material. It has a center hole which surrounds the piston rod 26, and the purpose of the diaphragm 14 is to prevent leakage of liquid from the cylinder 10. The cylinder 10, below the diaphragm 14, is filled with liquid. Different kinds of liquids can be used and the rate of operation of the switch depends partly upon the viscosity of the liquid. The most important characteristic of the liquid is that it should be inert to the metal or other materials of which the parts are made, and it should also be inert to the material of the diaphragm 14.

The cylinder 10 is surrounded by a sleeve 34 made of electrical insulating material. There is a washer 36 at the lower end of the sleeve 34 extending under most of the area of the end wall 11, and this washer 36 is also made of electrical insulating material. A terminal post 38 extends from the cylinder 10 through the insulating sleeve 34 and a portion of this terminal post 38, which is closest to the sleeve 34, is insulated by a sleeve 40. The outer end of the post 38 is exposed for receiving a clip or other connector for joining the post with other parts of an electric circuit.

The cylinder 10, a piston element 18 and spring 28 are preferably made of electrical conducting material so that there is a closed circuit from the top face of the piston rod 26 to the exposed end of the terminal post 38. This circuit can be obtained in other ways as by connecting a by-pass conductor from the piston rod 26 to the terminal post 38, but the construction illustrated is more rugged.

The top face of the piston rod 26 is indicated by the reference character 44, and this top face constitutes the compensating contact of the switch. In the combinations illustrated, this compensating contact 44 is used as the relatively fixed contact of the switch. A movable contact 46 is located above the piston rod 26 and this movable contact 46 moves up and down as a unit with some part of the machine on which the compensating switch is used as a control. It will be understood that terms of orientation, such as "up and down" are relative, and that the compensating switch can operate in any position since the diaphragm 14 will prevent leakage of liquid from the cylinder in all positions.

When the switch is used, the cylinder 10 or the movable contact 46 are positioned so that when the contacts 44 and 46 are brought together during the normal operation of the machine, the piston element 18 is thrust downwardly in the cylinder 10 for a few thousandths of an inch to put the spring under some compression. When the movable contact 46 moves away from the contact 44, as the machine operates, the contact 44 rises very slowly; but it is pushed downwardly again when the movable contact 46 again returns to its original position.

The rate at which the piston element 18 rises in the cylinder 10 depends principally upon how closely the heads 20 fit the bore of the cylinder. By having these heads fit very closely, the rate of rise of the piston element 18 can be made very slow. With most automatic machines, the time between successive contacts between the movable contact 46 and the relatively fixed contact 44 amounts to only a fraction of a second. It will be evident that if the switch is to be used for detecting small differences in the stroke of the movable contact 46, then the movement of the piston element 18, between strokes of the movable contact 46, must be less than the variation in stroke to be detected. For example, if the apparatus is to detect a change of three thousandths of an inch in the stroke of the movable contact 46, then the piston element 18 must not rise as much as three thousandths of an inch during a stroke of the contact 46.

In some of the illustrated embodiments of this invention, the control apparatus operates whenever the contact 46 approaches the relatively fixed contact 44 but fails to touch it. This will be explained more fully in connection with the other figures of the drawing. The important features to note in connection with the switch are that no accurate initial setting of the switch is necessary, and that it does not matter whether the movable contact pushes the relatively fixed contact 44 down three thousandths or twenty thousandths of an inch when the apparatus is originally started in operation. While the force of the spring 28 is slightly greater with more downward displacement of the piston element 18, the rate of rise of the piston element is made slow enough at all parts of the piston element stroke so as to stay well within the minimum stroke change which the switch is designed to measure.

Another outstanding advantage of the switch is that it can be used over extremely long periods and its operation is not affected by any wear of the faces of the contacts 44 and 46. If the contacts do wear, and this is inevitable over a long period, the effect is no different from a slightly higher original setting of the cylinder 10 or piston element 18.

Another important advantage of the switch is that changes in the stroke of the movable contact 46, which results from temperature changes of the machine and other conditions which occur slowly, do not affect the operation of the switch because the position of the relatively fixed contact 44 is automatically adjusted either upwardly or downwardly to compensate for changes in the position of the movable contact 46 at the end of its stroke, where such changes occur slowly and over a large number of repeated operations of the machine.

Figure 3 shows the compensating switch of Figure 1 connected in a control circuit of a machine. The compensating switch is indicated by the reference characters for its contacts 44 and 46. The machine includes a relatively fixed element 52 and a movable element 54 which reciprocates toward and from the relatively fixed element 52. The reciprocating movement of the element 54 is imparted by motion transmitting means which include a rotary shaft 56. There is a slip ring 58 connected to the shaft and this slip ring 58 has an insulating section 59 extending for a limited angular distance around the slip ring 58. A brush 60 is held in contact with the slip ring 58 by a leaf spring 62 which also serves as the conductor for the brush. The slip ring 58 is grounded as indicated by the ground connection 64.

The movable contact 46 of the self compensating switch is connected directly to the reciprocating element 54 and is therefore grounded on the machine in the same way as the slip ring 58.

The relatively fixed contact 44 of the self compensating switch, and the brush 60, are both connected with the same end of a control coil 66 to which power is supplied from a power source 68. This coil 66 may be a solenoid or a relay coil, and is merely representative of electrical actuators for a control circuit. The control circuit can operate a signal or operate a clutch release or shut off the power or perform any other operation which is desired in response to failure of the reciprocating element 54 to complete its stroke.

In the operation of the apparatus shown in Figure 3, the control coil 66 is grounded through the brush 60 and slip ring 58 during all of the rotation of the slip ring 58 except that part of the angular movement when the insulating section 59 is in contact with the entire face of the brush 60. This insulating section 59 is so located that it opens the circuit of the brush 60 during the time when the reciprocating element 54 is at the end of its downward stroke.

If the reciprocating element 54 comes into the expected position at the end of its stroke, the contact 46 touches the contact 44 of the compensating switch and provides a ground connection for the control coil 66 so that the coil remains energized in spite of the passage of the insulating section 59 across the brush 60. If at any time the reciprocating element 54 fails to move through its normal length of stroke, and the contacts 44 and 46 are separated from one another when the insulated section 59 of the slip ring passes the brush 60, then the control coil 66 is deenergized and the control circuit is operated.

Figure 4 shows a modification of the control apparatus of Figure 3. Corresponding parts are indicated by the same reference characters as in Figure 3. The machine illustrated diagrammatically in Figure 4 includes a ram 70 which reciprocates in a bearing 72, making one stroke for each stroke of the reciprocating element 54. The control coil 66 is grounded through a switch 74 whenever the ram 70 is in a raised position, but when the ram approaches the lower end of its stroke, it has an abutment 76 which opens the switch 74. When the apparatus is operating in the intended manner, the contact 46 of the compensating switch touches the relatively fixed contact 44 before the switch 74 is opened, or soon enough after the switch is opened to prevent the field of the coil 66 from decaying to a value which will cause the control apparatus to operate.

Figure 5 shows another modified control apparatus in which control coils 66 are normally grounded through contacts 44 and 46 of two self compensating switches 77 and 78. The movable contact 46 of each switch is connected to a frame including an arm 82 grounded by a connection 83. This arm 82 has a roller 85 at the end opposite the contact 46; and the roller 85 runs on a surface of a strip 86 feeding through the machine upon which the control apparatus is mounted. A roller 87 on a fixed axle makes contact with the strip 86 on the side opposite the roller 85. In the normal operation of the machine, with uniform thickness of the strip 86, the position of the arm 82 never changes, or changes only very slowly.

The self compensating switches 77 and 78 through their contacts 44 and 46 maintain constant ground connections for the control coils 66 unless through some unusual condition there is a sudden movement of the roller 85, and in that event one or the other of the compensating switches will open. For example, if the arm 82 moves clockwise, with a sudden movement, the contact 46 of the upper switch 77 moves away from the compensating contact 44 of this switch. If the arm 82 moves counterclockwise, with a sudden movement, the contact 46 of the lower switch 78 moves away from its compensating contact 44.

Figure 6 shows an electronic control circuit which requires no connection with the machine other than the mounting of the self compensating switch on the machine.

In Fig. 6, alternating current is supplied from a source 90 through a rectifier 91, which may be a half-wave selenium rectifier. A filtering capacitor 93 serves to store energy and deliver it during the non-conducting half cycle of the rectifier 91, thereby producing a smooth flow of direct current for the various sections of the circuit which are supplied with current.

A resistor 95, connected with the output side of the rectifier 91, reduces the voltage for operation of transistors 97 and 98 in a switching circuit which will be described. The rectifier 91 also supplies current to another capacitor 100 which is charged through a resistor 102.

The self compensating control switch is indicated by the reference characters of its contacts 44 and 46. This switch is connected in parallel with the capacitor 100 so that when the contacts 44 and 46 come together they discharge the capacitor 100. The contact 46 is connected with the capacitor 100 through two branch circuits, one of which includes a resistor 104 in series with a gas discharge tube 106; the other of which includes a resistor 108 in series with a rectifier 110. These branch circuits are connected to opposite sides of the resistor 102 for reasons which will be evident as the description proceeds.

The time constant of the charging path is mathematically the product of the resistance of the resistor 102 in ohms and the capacity of the capacitor 100 in farads, and in the preferred construction it is the length of time necessary to charge the capacitor 100 to two-thirds of its total capacity. If the voltage of the current supply is 150 volts then the capacitor 100 is charged to 90 volts with the period of one time constant. A period equal to approximately three time constants is required to fully charge the capacitor 100. These values have been used in practice but are merely given here by way of illustration and not as a limitation of the invention.

The control circuit includes also a third capacitor 115 connected between the resistor 102 and the transistor 97. There are parallel connections between the resistor 102 and the capacitor 115; one of the connections including a rectifier 117, and the other including a resistor 118.

The voltage which charges the capacitor 100 also charges the capacitor 115 at the same time. Once the capacitor 115 is charged to the same voltage as the capacitor 100, there is only a very small subsequent charging current to this capacitor 115 since the resistance of the resistor 118 is very high and the rectifier 117 also offers extremely high resistance to any leakage to the capacitor 115 back to the capacitor 100 when the latter is periodically discharged.

If the contact 44 and 46 fail to close during any cycle of the machine to which they are connected, the capacitor 100 is not discharged for that cycle and its charge will increase during the next cycle, for example to a value substantialy in excess of 100 volts. This increase in the charge on the capacitor 100 produces a corresponding increase in the charge on the capacitor 115. This produces a pulse of current in the control circuit beyond the capacitor 115.

It should be noted that the frequency of the closure of the contacts 44 and 46 does not affect the pulse in the control circuit so that after a certain maximum period, depending upon the constants of the circuit, the circuit is ready to detect a failure of switch closing no matter what the speed of the machine may be. The limiting speed of the control circuit is at very slow speeds of the machine. For example, it will be evident that if the capacitors 100 and 115 charge to their ultimate value between operations of the switch contacts 44 and 46, then a failure of these contacts to close cannot produce any further charge of the capacitors. Therefore, the minimum machine speed at which the control apparatus can operate in somewhat less than the period required to fully charge the capacitors 100 and 115. In order to make the control circuit operate at slower speeds, the time constant determined by the resistor 102 and capacitor 100, must be increased. All of the capacitors 93, 100 and 115 are preferably identical.

The gas discharge tube 106 is preferably a neon-indicator light and its purpose is to provide a visual indication that the control apparatus is functioning properly. When the contacts 44 and 46 come together there is a discharge through the tube 106 and the repeated discharges with each closing of the contacts 44 and 46 produce a blinking light which indicates that the control apparatus is operating. If at any time the blinking light discontinues, the operator of the machine is put on notice that the control circuit is no longer operating and the machine can be stopped to determine the cause of the failure.

The resistor 108 and rectifier 110 prevent voltage at a location 120 from charging the capacitor 100. Without this precaution the charge on the capacitor 100 would not be controlled by the time constant of the circuit through the resistor 102.

The control circuit beyond the capacitor 115, which may be described as "the switching circuit" is a transistorized one-shot multivibrator circuit which actuates a relay 124. This relay is a sensitive relay and operates whenever there is a pulse received from the circuit containing the capacitors 100 and 115.

This switching circuit has two sets of operation, one stable and the other unstable. Normally the transistor 97 conducts very little and is in the so-called "cut-off" condition while the transistor 98 is conducting heavily and maintaining the coil of relay 124 energized so as to hold the relay in the closed condition shown in Fig. 6. When a pulse of current, corresponding to a missed stroke of the machine, that is, failure of the contacts 44 and 46 to close during a cycle, is applied to the base of the transistor 97, this transistor begins conducting. Because of the connection of the transistor 97 in parallel with the operating coil of relay 124, this conducting by the transistor 97 reduces the voltage supplied to the coil of relay 124.

The lower voltage across the coil of relay 124 is fed back to the base of transistor 97 through a circuit 127 containing a capacitor 128 and thus tends to aid in making the transistor 97 conduct, and the transistor 98 cut off.

This "avalanche" effort continues rapidly until the capacitor 128 is discharged. If there is no new pulse to the switching circuit to trigger this switching circuit again, the capacitor 128 recharges, and the transistor 97 goes back to its stable cut-off condition, and the transistor 98 back to its stable conducting condition.

Any mal-functioning of the switching circuit will cause the relay 124 to open under influence of a light spring 130 which gives the relay a bias away from the stable operating condition shown in Fig. 6. It is a feature of the operation that the machine is stopped in the event of failure of the control apparatus to operate.

The preferred embodiments of the invention have been illustrated and described, but changes and modifications can be made, and some of the features of the invention can be used in different combinations without departing from the invention as defined in the claims.

What is claimed is:

1. Circuit control apparatus including switch means having a compensating contact, a resilient element supporting the contact, fluid-controlled retarding means limiting the return rate of the compensating contact and the resilient element to an original position after displacement of the contact and resilient element from an original position, means for insulating the compensating contact from a part of a machine to which it is to be connected, and means for connecting the switch to a machine with the compensating contact in a circuit with a relatively movable element of a machine which serves to close the electric circuit and displace the compensating contact from its original position in one portion of the motion of the movable element and to move away from the displaced compensating contact at other portions of the motion of the movable element and break said electric circuit and thus cooperate with said compensating contact to close and open said circuit during different parts of a cycle in the operation of the machine.

2. Circuit control apparatus including switch means having a compensating contact, a resilient element supporting the contact, retarding means limiting the return rate of the compensating contact and the resilient element to an original position after displacement of the contact and resilient element from an original position, means for insulating the compensating contact from a part of a machine to which it is to be connected, and means for connecting the switch to a machine with the compensating contact in a circuit with a relatively movable element of a machine which serves to close the electric circuit and displace the compensating contact from its original position in one portion of the motion of the movable element and to move away from the displaced compensating contact at other portions of the motion of the movable element and break said electric circuit and thus cooperate with said compensating contact to close and open said circuit during different parts of a cycle in the operation of the machine, said retarding means including a dash pot having a cylinder and a piston element movable in the cylinder, the compensating contact being carried by one of the parts of the dash pot.

3. Circuit control apparatus including switch means having a compensating contact, a resilient element supporting the contact, retarding means limiting the return rate of the compensating contact and the resilient element to an original position after displacement of the contact and resilient element from an original position, means for insulating the compensating contact from a part of a machine to which it is to be connected, and means for connecting the switch to a machine with the compensating contact in a circuit with a relatively movable element of a machine which serves to close the electric circuit and displace the compensating contact from its original position in one portion of the motion of the movable element and to move away from the displaced compensating contact at other portions of the motion of the movable element and break said electric circuit and thus cooperate with said compensating contact to close and open said circuit during different parts of a cycle in the operation of the machine, said retarding means including a dash pot having a piston and a cylinder in which the piston moves, the compensating contact being carried by the piston and the piston being urged toward an original position by a spring located in the cylinder and pressing against the piston, and the cylinder having liquid therein for obtaining slower return movement of the piston when it is displaced from its original position.

4. The combination with a machine of circuit control apparatus including switch means having a compensating contact, a resilient element by which the compensating contact is given a bias in one direction, means supporting the compensating contact for movement with and against the resilient element, the switch means with the compensating contact being attached to one element of the machine, a bumper contact connected with another element of the machine in position to touch and displace the compensating contact during relative movement of the elements of the machine when the elements of the machine are in a position that they occupy with respect to one another during normal operation of the machine, electric insulating means insulating one of the contacts from the machine, and fluid-controlled retarding means for slowing the return movement of the compensating contact to its original position after displacement of the compensating contact from said original position.

5. The combination of a machine and circuit control apparatus including switch means having a compensating contact, a resilient element by which the compensating contact is given a bias in one direction, means supporting the compensating contact for movement with and against the resilient element, said compensating contact being displaceable from an original position, and retarding means for slowing the return movement of the compensating contact to its original position after a displacement therefrom, the switch means with the compensating contact being attached to one element of the machine, a bumper contact connected with another element of the machine in position to touch and displace the compensating contact when the said elements of the machine are in a position that they occupy with respect to one another during normal operation of the machine, electric insulating means insulating one of the contacts from the machine, said machine having a rotatable element that turns in timed relation to a cycle of operation of the machine, a rotary switch operated by the rotatable element and connected in a circuit with one of the contacts of the switch means, the rotary switch and said switch means being connected with moving elements of the machine so that the rotary switch is open when the contacts of the switch means are touching one another during normal operation of the machine.

6. The combination of a machine and circuit control apparatus including switch means having a compensating contact, a resilient element by which the compensating contact is given a bias in one direction, means supporting the compensating contact for movement with and against the resilient element, said compensating contact being displaceable from an original position toward which it is returned by said resilient element, and retarding means for slowing the return movement of the compensating contact to its original position after a displacement therefrom, the switch means with the compensating contact being attached to one element of the machine, a bumper contact connected with another element of the machine in position to touch and displace the compensating contact during relative movement of the elements of the machine when said last-named elements are in a position that they occupy with respect to one another during normal operation of the machine, electric insulating means insulating one of the contacts from the machine, a make-and-break switch connected in parallel with the switch means having the compensating contact, a reciprocating ram for the machine by which the make-and-break switch is operated, the contacts of the switch means being connected to relatively movable elements of the machine to which motion is transmitted from the ram in such positions that the contacts touch one another when the relatively movable elements of the machine are brought into their ultimate working relation with one another during each reciprocation of the ram, the make-and-break switch and the switch means being so connected with the machine that the make-and-break switch is moved into open condition at substantially the same time that the contacts of said switch means come into abutment with one another.

7. The combination of a machine and circuit control apparatus including switch means having a compensating contact, a resilient element by which the compensating contact is given a bias in one direction, means supporting the compensating contact for movement with and against the resilient element, said compensating contact being displaceable from an original position toward which it is returned by said resilient element, and retarding means for slowing the return movement of the compensating contact to its original position after a displacement therefrom, the switch means with the compensating contact being attached to one element of the machine, a bumper contact connected with another element of the machine in position to touch and displace the compensating contact during relative movement of the elements of the machine when said last-named elements are in a position that they occupy with respect to one another during normal operation of the machine, electric insulating means insulating one of the contacts from the machine, said two elements of the machine remaining in constant relation to one another during normal operation of the machine, but one of which moves with respect to the other upon abnormal operation of the machine, and said compensating contact and the bumper contact of the said switch means each being connected with a different one of said elements that remain in constant relation to one another.

8. The combination of a machine and circuit control apparatus including switch means having a compensating contact, a resilient element by which the compensating contact is given a bias in one direction, means supporting the compensating contact for movement with and against the resilient element, said compensating contact being displaceable from an original position toward which it is returned by said resilient element, and retarding means for slowing the return movement of the compensating contact to its original position after a displacement therefrom, the switch means with the compensating contact being attached to one element of the machine, said contact being displaceable by a bumper contact connected with another element of the machine in position to touch and displace the compensating contact during relative movement of the elements of the machine when said last-named elements are in a position that they occupy with respect to one another during normal operation of the machine, electric insulating means insulating one of the contacts from the machine, said control apparatus also including a capacitor which is charged progressively to a fraction of its capacitance during each cycle of operation of the machine, and a discharge circuit controlled by said switch means for discharging the capacitor at a predetermined time in each cycle of the normal operation of the machine, the circuit through which the capacitor is charged having a substantially higher voltage than the charge transmitted to the capacitor during each cycle whereby the capacitor is charged above its normal predetermined voltage during a second cycle of the operation of the machine in the event that the switch means fail to operate to discharge the capacitor during a first cycle of operation.

9. The combination of a machine and control apparatus, as described in claim 8, and in which the control circuit includes a second capacitor which is charged from the first capacitor through a circuit containing a rectifier which prevents discharge of the second capacitor, the circuit of the second capacitor having a high resistance leak through which the second capacitor adjusts its charge downwardly to compensate for gradual changes in the level of a power supply.

10. The combination of a machine having a pair of relatively movable elements and circuit control apparatus, the latter including switch means mounted on one of said elements and having a compensating contact displaceable from an original position, biasing means for opposing such displacement and retarding means for slowing return movement of said compensating contact to its original position, said contact being adapted to be touched and displaced from its original position during a cycle of the operation of the machine by a bumper contact on the other of said elements, and said control apparatus also including a capacitor, a charging circuit from a power source through which the capacitor is charged progressively to a fraction of its capacitance during each cycle of operation of the machine and a discharge circuit for said capacitor controlled by said switch means for discharging the capacitor at a predetermined time in each cycle of normal operation of the machine, the capacitor charging circuit having a substantially higher voltage input than the charge transmitted by it to the capacitor during each cycle whereby the capacitor is charged above its normal predetermined voltage during a second cycle of operation of the machine in the event that said switch means fails to operate the discharge circuit to discharge the capacitor during a first cycle of machine operation.

11. The combination of claim 10 wherein the circuit control apparatus includes a second capacitor and a circuit for charging it from the first capacitor, said last-named circuit including a high resistance leak through which said second capacitor adjusts its charge downwardly to compensate for gradual changes of level of the power supply.

12. The combination with a machine having a pair of relatively movable elements, of control apparatus therefor including a movable contact secured to one of said elements, a compensating contact secured to a second of said elements and adapted to be engaged and displaced from an original position by said movable contact during a cycle of operation of said machine, a power supply, a capacitor, a charging circuit connecting the power supply and the capacitor to charge the latter progressively to a fraction of its capacitance during each cycle of operation of the machine, a discharge circuit connected to said capacitor and closed by engagement of the said contacts to discharge said capacitor at a predetermined time in each cycle of normal operation of the machine, the charging circuit having a substantially higher input voltage than the charge transmitted by it to the capacitor during each cycle whereby the capacitor will be charged above its normal predetermined voltage on a second cycle of the operation of the machine in the event that said contacts fail to engage and close the discharge circuit during the first cycle of machine operation.

References Cited in the file of this patent

UNITED STATES PATENTS

| 1,662,711 | Maynard | Mar. 13, 1928 |
| 1,942,268 | Zeno | Jan. 2, 1934 |
| 2,328,114 | Weaver et al. | Aug. 31, 1943 |
| 2,677,125 | Pistoles | Apr. 27, 1954 |
| 2,783,460 | Pistoles | Feb. 26, 1957 |